United States Patent
Pavesi et al.

(10) Patent No.: US 11,477,991 B2
(45) Date of Patent: Oct. 25, 2022

(54) PROCESS FOR PRODUCING A CHEWING-GUM PELLET

(71) Applicant: SOREMARTEC S.A., Senningerberg (LU)

(72) Inventors: Enrico Pavesi, Alba (IT); Christian Basilico, Alba (IT)

(73) Assignee: SOREMARTEC S.A., Senningerberg (LU)

( * ) Notice: Subject to any disclaimer, the term of this patent is extended or adjusted under 35 U.S.C. 154(b) by 683 days.

(21) Appl. No.: 16/025,289

(22) Filed: Jul. 2, 2018

(65) Prior Publication Data

US 2019/0008180 A1    Jan. 10, 2019

(30) Foreign Application Priority Data

Jul. 6, 2017 (LU) .................................. 100332

(51) Int. Cl.
*A23G 4/04* (2006.01)
*A23G 4/18* (2006.01)
*A23G 7/00* (2006.01)

(52) U.S. Cl.
CPC ............... *A23G 4/04* (2013.01); *A23G 4/18* (2013.01); *A23G 7/0093* (2013.01)

(58) Field of Classification Search
CPC ........... A23G 4/04; A23G 4/18; A23G 7/0093
See application file for complete search history.

(56) References Cited

U.S. PATENT DOCUMENTS

| | | | | |
|---|---|---|---|---|
| 6,200,608 B1* | 3/2001 | Gmunder | ................ | A23G 4/00 426/3 |
| 6,497,106 B2* | 12/2002 | Lang | ..................... | A23B 4/062 426/524 |
| 6,551,643 B2* | 4/2003 | Bernatz | ................ | A23G 3/0242 425/202 |
| 7,374,579 B2* | 5/2008 | Larson | ..................... | A22C 7/00 425/289 |
| 8,329,235 B2* | 12/2012 | Mikkelsen | ............... | A23G 4/02 426/3 |
| 2003/0099741 A1* | 5/2003 | Gubler | ..................... | A23G 7/02 426/5 |
| 2004/0170721 A1 | 9/2004 | Athanikar et al. | | |
| 2006/0257524 A1 | 11/2006 | Mikkelsen et al. | | |

FOREIGN PATENT DOCUMENTS

EP    20 22 336 B1    6/2013
EP    1 395 123 B1    7/2016

OTHER PUBLICATIONS

Extended European Search Report dated Nov. 7, 2018, cited in EP Application 18181528.3, 7 pages.

* cited by examiner

*Primary Examiner* — Nikki H. Dees
(74) *Attorney, Agent, or Firm* — Rothwell, Figg, Ernst & Manbeck, P.C.

(57) ABSTRACT

Described herein is a process for producing a chewing-gum pellet, which includes a step of granulation of the gum that is carried out in a flow of cryogenic gas.

9 Claims, 3 Drawing Sheets

FIG. 3

| Flow | Parameter | Test 1 | Test 2 | Test 3 |
|---|---|---|---|---|
| Liquid $CO_2$ | Temperature | 20°C | 20°C | 20°C |
| | Flow rate | 250 kg/h | 230 kg/h | 200 kg/h |
| Air | Temperature | 20°C | 20°C | 20°C |
| | Flow rate | 1000 $Cm^3/h$ | 1000 $m^3/h$ | 1000 $m^3/h$ |
| Flavoured gum base | Temperature | 75°C | 90°C | 110°C |
| | Pressure | 2 bar | 2 bar | 2 bar |
| | Flow rate | 20 kg/h | 20 kg/h | 20 kg/h |
| Die plate | Temperature | 85°C | 100°C | 135°C |
| Cryogenic gas ($CO_2$ + air) cutting chamber | Temperature | -80°C | -60°C | -40°C |

PROCESS FOR PRODUCING A CHEWING-GUM PELLET

CROSS REFERENCE TO RELATED APPLICATION

This application claims priority to Luxembourgian Patent Application No. 100332 filed on Jul. 6, 2017, the disclosures of which is incorporated herein in its entirety by reference.

TECHNICAL FIELD AND PRIOR ART

The present invention relates to a process for producing a chewing-gum pellet, in particular to a process of the type comprising a step of granulation of the gum to obtain granules of small size, with a diameter of less than 1 cm.

The document No. EP 1 395 123 B1 describes a process for producing miniaturized gum-ball centres that themselves constitute the finished product, either in the same form as they are directly obtained from the granulation process or, in any case, after they have been simply coated through an enrobing, or panning, process.

The document No. EP 20 22 336 B1 describes, instead, a process for producing compressed chewing-gum tablets, which envisages obtaining, first, gum granules through a granulation process of the type in question and then pressing the granules obtained inside a mould, possibly together with further ingredients, to form the tablet.

The processes illustrated in the above documents envisage a process of granulation of the gum that is carried out in water. Water operates as fluid for cooling the granules that have just been formed and moreover as carrier for conveying them on to the subsequent stages of the production process.

In regard to the granulation process described above, the present applicant has identified a series of drawbacks. In the first place, water leads to dispersion of the soluble substances contained in the formulation of the gum, hence altering the organoleptic properties of the end product. The solutions adopted in the art for compensating for this reaction complicate the process and raise the production costs. Furthermore, this type of granulation process entails a large consumption of water and also of energy since the water must be filtered and conditioned thermally before it can be used. Also these aspects markedly affect the production costs. Re-use of the water used previously in the process—which, for this purpose, must be taken from the discharge ducts of the system, treated through various batteries of filters, again conditioned, and finally re-introduced into the cooling circuit—constitutes only a partial solution to the above problems in so far as the number of times that the same water can be re-used is in any case limited, and among other things for this purpose the system must be pre-arranged with a complex water-treatment system, and hence a lot of energy is consumed for operation of the aforesaid system.

Aim and Subject of the Invention

The present applicant has now identified a process for producing chewing-gum pellets that uses a granulation process that is free from the aforesaid drawbacks.

The process according to the invention presents in particular the characteristics recalled in the ensuing claims.

The claims form an integral part of the technical teaching provided herein in relation to the invention.

BRIEF DESCRIPTION OF THE DRAWINGS AND DETAILED DESCRIPTION OF ONE OR MORE EMBODIMENTS OF THE INVENTION

Further characteristics and advantages of the invention will emerge clearly from the ensuing description with reference to the annexed drawings, which are provided purely by way of non-limiting example and in which:

FIG. 3 presents a table regarding various tests conducted by the present applicant.

Figure 1:
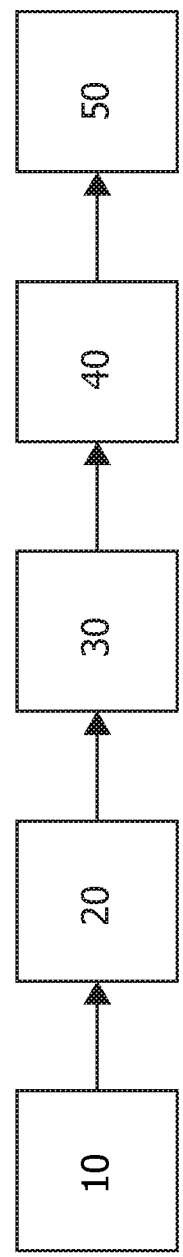
FIG. 1 represents, with a block diagram, the production process described herein.

In the ensuing description various specific details are illustrated aimed at providing an in-depth understanding of the embodiments. The embodiments may be implemented without one or more of the specific details, or with other methods, components, or materials, etc. In other cases, known structures, materials, or operations are not illustrated or described in detail so that various aspects of the embodiment will not be obscured.

The references used herein are provided merely for convenience and hence do not define the sphere of protection or the scope of the embodiments.

As anticipated above, the process described herein is designed to produce chewing-gum pellets.

In general, the process described herein comprises the following steps:

mixing gum base with one or more sweetening substances;

putting the mix obtained into an extruder in which said mix is heated, preferably up to a temperature above 60° C.;

extruding said mix through the die plate of the extruder, the die plate being provided with a plurality of openings with a diameter of less than 1.5 mm;

cutting with a knife the strands of mix coming out of the extruder, within a cutting chamber that is traversed by a flow of gas in the cryogenic state, preferably having a temperature below −40° C., so as to produce chewing-gum granules that have a diameter of less than 2 mm, which are immediately cooled within said cutting chamber and carried away from said chamber by said flow of gas; and mixing said granules with one or more flavouring substances and/or one or more sweetening substances and pressing the composition obtained in a mould to form a coated chewing-gum pellet.

In view of the foregoing, the process described herein envisages a granulation process that does not use water but rather a cryogenic gas. This is used both for cooling the gum that emerges in the cutting chamber and is immediately reduced into granules and for conveying the granules obtained to the subsequent stages of the system.

Preferably, the gas used is a mixture of air and a cryogenic gas, for example carbon dioxide or nitrogen in the cryogenic state. Other cryogenic gases that are suited to use with food can be used.

The mixture of gases is prepared with the air that constitutes the predominant fraction of the mixture and the cryogenic gas, e.g. carbon dioxide, that is present in a fraction that is uniquely a function of the desired cooling temperature. As mentioned above, the granulation process described herein envisages that the temperature of the gas blown into the cutting chamber is below −40° C. Preferably, this mixture is formed directly in the system, according to a continuous cycle simultaneous with production of the chewing-gum pellets.

In a preferred embodiment, a flow of air is generated within a duct for circulation of the air and the cryogenic gas is blown into the duct. The duct is in communication with the aforesaid cutting chamber. The air flow rate is regulated as a function of the mass rate of chewing-gum granules to be conveyed. Once again in a preferred way, the cryogenic gas is contained in liquefied form within a tank, and passes to the gaseous state by expansion, through an expansion valve which connects the tank to the duct and blows the cryogenic gas into the duct.

As compared to the known granulation processes mentioned at the start, the method described herein hence presents the major advantage of not using water, thus not being subject to the drawback discussed at the start, represented by the risk of altering gum formulations that contain soluble substances.

Not only this, but, as mentioned, the cooling gas used in the process is basically constituted by air taken in at room temperature and then cooled by blowing cryogenic gas (e.g. carbon dioxide) into it. The system for implementing the above process may hence be limited to providing a system for movement of air and for conveying it through the cutting chamber, thus being far simpler than the systems used for the granulation processes of the known type referred to at the start, and hence also more reliable, an aspect that is decisive in this field of application, taking into account that the processes in question are commonly used for very-large-scale production.

With reference now to FIG. 1, illustrated therein is a block diagram of an embodiment of the process described herein.

Step 10 envisages mixing gum base with one or more sweetening agents and possibly with one or more flavours. In a way in itself conventional, there may then also be added plasticizing agents for softening the gum.

In general, these components may be chosen from the ones commonly used in the technical field in question.

By way of example, typical base-gum compositions envisage: polymers/elastomers, talcum or calcium carbonate, resins, waxes, emulsifying and plasticizing agents.

Examples of sweeteners that may be used are:
aspartame, acesulphame potassium, sucralose, polyols, etc.

Examples of flavours that may be used are: mint essential oils, spearmint essential oils, menthol, flavours in powder form, encapsulated flavours, etc.

Examples of plasticizing/emulsifying agents that may be used are: soybean or sunflower lecithin, esters of acetic acid, esters of fatty acids, etc.

The next step 20 is represented by the granulation process discussed above.

Figure 2:
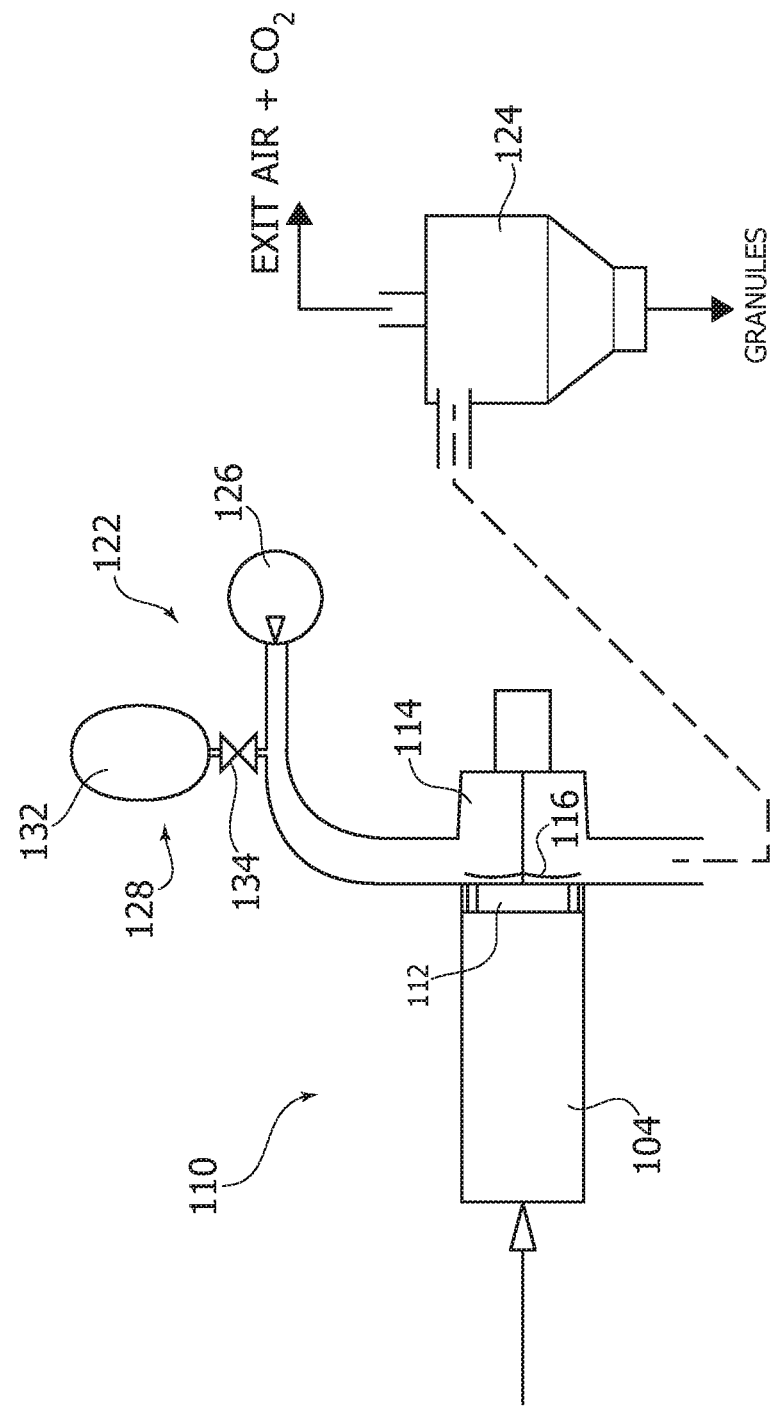
FIG. 2 is a schematic illustration of an embodiment of the system for the granulation process envisaged in the procedure described herein.

With reference to the above process, FIG. 2 illustrates an example of system for implementation thereof.

The above system comprises an extruder device 110, which includes a collection chamber 104, heated, for example, via electrical heating resistors provided on the walls that surround the chamber, to which the mix of gum base, flavours, and plasticizing agents previously obtained is sent.

In alternative embodiments, the above mix may instead be directly formed within the chamber 104.

The extruder device 110 moreover envisages a die plate 112 in which a plurality of holes are made, of a size selected according to the size of the granules to be produced.

The die plate 112 separates the collection chamber 104 from the cutting chamber 114, within which a rotary blade 116 operates, which is set directly facing the die plate. The system envisages one or more pumps (not illustrated) designed to force the gum mix through the die plate 112, feeding it into the cutting chamber 114.

The cutting chamber 114 is inserted inside an air-conveying circuit, which originates in an injection section 122, upstream of the chamber 114, and terminates, downstream of the aforesaid chamber, at a cyclone separator 124.

The injection section 122 is equipped with an air-movement system 126, which introduces into the circuit, at the section 122, a flow of air at a pre-set pressure. This system, which in the figures is schematically represented by the symbol of a compressor, may, for example, envisage a compressor or a fan with possible air-treatment system.

The above section 122 is moreover equipped with an assembly 128 designed to blow into the circuit the cryogenic gas, e.g. carbon dioxide in the cryogenic state. In various preferred embodiments, the assembly 128 comprises a tank 132 containing the cryogenic gas in the liquid state, which is connected to the main duct of the circuit, through an expansion valve 134.

In operation, the pressure within the tank 132 causes supply of the cryogenic gas into the circuit, and the expansion valve causes its transition into the gaseous state, with consequent lowering of its temperature. The person skilled in the sector will understand that, as a function of the pressure and temperature, a part of the cryogenic gas (e.g. carbon dioxide) introduced into the circuit may also pass into the solid state, becoming dry ice. This represents in effect an undesired transition, so that operating conditions such as to limit the amount of dry ice generated during operation will be preferable.

Blowing-in of the cryogenic gas into the circuit leads to formation therein of a mixture of gases (e.g. air and carbon dioxide) in the cryogenic state, which thus performs the functions mentioned above of cooling the granules produced and conveying them to the subsequent stages of the system.

As mentioned above, the fraction of the cryogenic gas (e.g. carbon dioxide) that is envisaged in this mixture is determined on the basis of the required cooling temperature. With reference to the embodiment of FIG. 2, the amount of the cryogenic gas that is blown into the circuit may be adjusted by modifying the degree of opening of the expansion valve 134.

In any case, as has been seen, the cryogenic gas constitutes a minor portion of the gas mixture, this prevalently being formed by air.

It should now be noted that the present applicant has verified that the aforementioned action performed by the above type of mixture may be considered effective only for granules that do not exceed the size of 2 mm. This may be explained by the fact that the larger the size of the granules, the higher the cooling power and the entrainment force of the mixture needed, these being characteristics that, above the threshold mentioned, are not both satisfied fully by the gas mixture here referred to.

With reference now to operation of the granulation system illustrated in FIG. 2, the gum that reaches the collection chamber 104 is heated up to the pre-set temperature and is then forced through the die plate 112, within the cutting chamber, emerging into the latter in the form of a plurality of strands of pre-set diameter. The strands are immediately cut by the rotary blade 116, as soon as they enter the cutting chamber, thus being reduced into granules.

At the same time, the gas mixture injected in the section 122 passes through the cutting chamber, impinging upon the strands of gum that exit from the die plate and upon the granules obtained therefrom, so as to cool the gum instantaneously and entrain the granules out of the cutting chamber, up to the cyclone separator 124. In this process, the granules are separated from the gas mixture and fed to the subsequent steps of the process. In a way that is in itself conventional, the granules may possibly be sprinkled with anti-agglomerating agents, for example talcum, before being sent on to the subsequent steps of the process.

The present applicant has conducted various tests. Appearing in the table of FIG. 3 are the data of three different tests, which differ from one another basically as regards the temperatures envisaged, respectively, for the gum in the extruder, the die plate, and the cooling gas inside the cutting chamber. The gum composition used was the same for all three tests, and comprised 80 wt % gum base, 10 wt % flavours, and 10 wt % sweeteners. The die plate had holes of diameter equal to 0.65 mm. In all the tests, the flow of the gas was constituted prevalently by air. The cryogenic gas used was carbon dioxide. Test 1 was the one yielding the best results in terms of homogeneity of the product and continuity of production; this may, it appears, be put down to the lower temperature of the cooling gas and its higher flow rate. Here below is attached the table with the data of the particle-size distribution curve for the granules obtained in Test 1.

| | |
|---|---|
| >1600 μm | 0% |
| 1000 ÷ 1600 μm | 3.19% |
| 600 ÷ 1000 μm | 86.00% |
| 250 ÷ 600 μm | 2.45% |
| <250 μm | 8.36% |
| | (only talcum) |

It should be noted that, in general, the granules obtained with the process described have in any case a substantially homogeneous size thanks to the type of system used, which is able to control the size of the granules produced in a more effective way as compared to other types of machines, such as for example mills.

To return to FIG. 1, after granulation, the process described herein envisages a step 30 in which the granules are mixed with further substances, in particular sugars, sweeteners, flavours, and lubricants.

In general, the above components may be chosen from those commonly used in the technical field in question.

By way of example, the sweetening agents that may be used are: aspartame, acesulphame K, sucralose, polyols (sorbitol, isomalt, xylitol, maltitol), etc. The flavours that may be used are: mint essential oils, spearmint essential oils, menthol, flavours in powder form, encapsulated flavours, etc. Some examples of lubricants are: magnesium stearate, talcum, etc.

The substances referred to are in powder form, if not individually, at least in their overall composition, this in view of the subsequent step 40 of the process, which envisages, in fact, pressing in a mould the granules and the aforesaid additional substances to form a compressed pellet. This step may, for example, be performed using a rotary pressing machine.

In various preferred embodiments, the ratio in weight percentage of the granules and the other substances is equal to or higher than 40 wt %.

Finally, the process described herein envisages a step 50 of coating of the pellet. In a way altogether conventional, this may be done using a common enrobing process. The coating layer may, for example, be constituted by a sugary syrup.

By way of example, typical formulations for such syrups comprise water, xylitol, and Arabic gum.

Of course, without prejudice to the principle of the invention, the details of construction and the embodiments may vary, even significantly, with respect to what has been illustrated herein purely by way of non-limiting example, without thereby departing from the scope of the invention, as defined in the annexed claims.

The invention claimed is:

1. A process for producing a chewing-gum pellet, comprising the steps of:
    mixing gum base with one or more sweetening substances;
    putting the mix obtained inside an extruder, where said mix is heated;
    extruding said mix through the die plate of the extruder, the die plate being provided with a plurality of openings with a diameter of less than 1.5 mm, wherein strands of said mix come out of the extruder;
    cutting with a knife the strands of mix coming out of the extruder, within a cutting chamber that is traversed by a flow of gas in the cryogenic state, so as to produce granules of chewing gum that have a diameter of less than 2 mm, which are immediately cooled within said cutting chamber and carried away from said chamber, by said flow of gas; and
    mixing said granules with one or more flavouring substances and/or one or more sweetening substances and pressing the composition obtained within a mould to form a chewing-gum pellet,
    wherein said flow of gas is constituted by a mix of air and a cryogenic gas,
    wherein the process further comprises generating a flow of air within a duct for circulation of the air and blowing into said duct said cryogenic gas,
    wherein the process further comprises regulating the amount of said cryogenic gas that is blown into said duct as a function of a pre-set cooling temperature for said gas mixture to cool said chewing-gum granules, and
    wherein the process further comprises regulating the flow of air within the duct as a function of a mass rate of chewing-gum granules to be conveyed.

2. The process according to claim 1, further comprising producing said gas mixture according to a continuous cycle simultaneous with production of said granules of gum.

3. The process according to claim 1, wherein said cryogenic gas is contained in liquefied form within a tank, and passes to the gaseous state by expansion, through an expansion valve which connects said tank to said duct and blows said cryogenic gas into said duct.

4. The process according to claim 1, wherein within said extruder said mix of gum base and one or more sweetening substances is heated up to a temperature higher than 60° C.

5. The process according to claim 1, wherein said flow of gas in the cryogenic state has a temperature lower than −40° C.

6. The process according to claim 1, wherein mixing said gum base with one or more sweetening substances further comprises mixing said gum base with one or more flavouring substances.

7. The process according to claim 1, further comprising coating said formed-in-mould chewing-gum pellet.

8. The process according to claim 1, wherein said mix of air and a cryogenic gas constituting said flow of gas comprises carbon dioxide.

9. A process for producing a chewing-gum pellet, comprising the steps of:
- mixing gum base with one or more sweetening substances;
- putting the mix obtained inside an extruder, where said mix is heated;
- extruding said mix through the die plate of the extruder, the die plate being provided with a plurality of openings with a diameter of less than 1.5 mm, wherein strands of said mix come out of the extruder;
- cutting with a knife the strands of mix coming out of the extruder, within a cutting chamber that is traversed by a flow of gas in the cryogenic state, so as to produce granules of chewing gum that have a diameter of less than 2 mm, which are immediately cooled within said cutting chamber and carried away from said chamber, by said flow of gas;

wherein said flow of gas is constituted by a mix of air and a cryogenic gas and mixing said granules with one or more flavouring substances and/or one or more sweetening substances and pressing the composition obtained within a mould to form a chewing-gum pellet, wherein said flow of gas is constituted by a mix of air and a cryogenic gas, wherein the process further comprises generating a flow of air within a duct for circulation of the air and blowing into said duct said cryogenic gas, wherein the process further comprises regulating the amount of said cryogenic gas that is blown into said duct as a function of a pre-set cooling temperature for said gas mixture to cool said chewing-gum granules, and wherein the process further comprises regulating the flow of air within the duct as a function of a mass rate of chewing-gum granules to be conveyed.

* * * * *